United States Patent Office 2,843,576
Patented July 15, 1958

2,843,576

PRODUCTION OF VINYL COMPOUNDS

James H. Dunn and Percy W. Trotter, Baton Rouge, La., assignors to Ethyl Corporation, New York, N. Y., a corporation of Delaware No Drawing. Application December 3, 1953
Serial No. 396,057

5 Claims. (Cl. 260—92.8)

This invention relates to the polymerization of vinyl type compounds and more particularly to an improved emulsion polymerization process.

There are several methods for polymerizing vinyl type compounds now known and practiced commercially. In general, these methods include emulsion, suspension, and bulk techniques. The conventional emulsion and suspension processes produce granular or powdery type products, whereas the bulk type produces a solid and dense product. Either of these products is difficult to process. The powdery type tends to dust and is otherwise difficult to handle. The solid, dense product, made by bulk polymerization, is very difficult to process and must normally be ground prior to use. This is particularly true of polymers, such as vinyl chloride, which require the addition of a plasticizer. Obviously following grinding of the dense solid product, the same problems are encountered as with products from the commercial emulsion or suspension polymerization techniques.

It is accordingly an object of this invention to provide an improved process for the polymerization of vinyl type compounds. Another object is to provide a process which is adapted to produce a product in aggregate form which does not tend to dust but which has a relatively uniform particle diameter. Another object is to provide a product of the above type having a high surface area and which is readily dissolved by solvents or easily admixed with plasticizers. Still another object of the invention is to provide a product which is easily handled and processed.

The process of this invention comprises the polymerization of vinyl type compounds in an aqueous emulsion system, using a controlled amount of emulsifying agent and employing a water-insoluble catalyst which is soluble in the monomer or monomers. As is well known, the conventional emulsion polymerization technique employs a water-soluble catalyst, such as a persulfate, and results, in contrast to the present invention, in a finely divided product. The product produced by the present invention is obtained as highly porous aggregates having a high surface area per unit per volume and resembles "popcorn" in appearance. The product has a very low density and the particles obtained in the polymerization having a surprising uniformity in size.

The polymerization process of this invention is suitable for a wide variety of polymerizable olefinic monomers having the general formula

>C=C<

Typical examples of these monomers are the vinyl halides, i. e., vinyl chloride, vinyl fluoride, vinyl bromide and vinyl iodide; the vinylidene halides, i. e., vinylidene chloride, vinylidene fluoride, vinylidene bromide, and vinylidene iodide; 2-halogenobutadienes; esters of unsaturated alcohols with mono- and polybasic saturated and unsaturated acids, such as vinyl acetate, allyl acetate, diallyl maleate, etc.; esters of saturated alcohols with mono- and polybasic unsaturated acids, such as methyl acrylate, ethyl acrylate, methyl methacrylate, ethyl methacrylate, haloacrylates, diethyl maleate, diethyl fumarate, etc.; unsaturated ethers, such as divinyl ether, diallyl ether, vinyl alkyl ethers, allyl alkyl ethers; unsaturated nitriles, such as acrylonitrile, methacrylonitrile, haloacrylonitriles, phenyl acrylonitriles, vinylidene cyanide, etc.; unsaturated amides, such as acrylamide, methacrylamide, N-substituted unsaturated amides, e. g., N,N-dimethyl acrylamide, N,N-diethylacrylamide, N-methylacrylamide, etc.; unsaturated acids and anhydrides, such as acrylic acid, methacrylic acid, crotonic acid, itaconic acid, maleic anhydride, etc.; unsaturated ketones, such as divinyl ketone, vinyl alkyl ketones, etc.; unsaturated aldehydes and acetals, such as acrolein and its acetals, methacrolein and its acetals, etc.; unsaturated aromatic compounds, such as divinyl benzene, styrene, mono- and polyhalo styrenes, alkyl styrenes, cyano styrenes, allylbenzene, vinyl naphthalene, etc.; unsaturated heterocyclic compounds, such as vinyl pyridine, vinyl furan, vinyl coumarone, vinyl dibenzofuran, N-vinyl carbazole, etc.; and unsaturated alicyclic compounds, such as vinylcyclopentane, vinyl cyclohexane, etc.

In general, any water insoluble organic peroxide is suitable for use in the process of this invention. However the peroxide selected should be soluble or miscible in the monomer or monomers to be polymerized. Typical examples of suitable catalysts are benzoyl peroxide, t-butyl hydroperoxide, di-isopropylbenzene monohydroperoxide, acetyl peroxide, di-t-butyl peroxide, α,α'-azo-bis-isobutylonitrile, p-methane hydroperoxide, lauroyl peroxide, acetyl benzoyl peroxide, succinyl peroxide, peracetic acid, m-bromobenzoyl peroxide, persuccinic acid, urea peroxide, dialkyl peroxy dicarbonate, ascaridole, and cyclohexanone peroxide.

The concentration of the catalysts is not critical but normally should not exceed about one percent of the monomer. A more preferred catalyst concentration is between about 0.1 and 0.5 based on the weight of the monomer.

The emulsifying agents suitable for use in the above processes are any of the well-known cationic, anionic and non-ionic types. Typical examples of emulsifying agents are naphthalenic soaps or sulfonates; sulfonation products of glycerides or their fatty acids; sulfonated derivatives of esters of mono- and polyvalent alcohols; esterification products of fatty acids and sulfonated monovalent alcohols; sulfonated derivatives of fatty acid esters, such as the diamyl or dioctyl esters of sodium sulfo succinic acid; sulfonation products of fatty amides, ketones, aldehydes, and nitriles; sulfonation products of natural and synthetic alcohols, such as alkyl sulfates and sulfonates, phosphoric and pyrophosphoric esters of fatty alcohols, such as the sodium salt of 2-ethyl hexyl phosphate; amino carboxylic acids; sulfonated aromatic hydrocarbons, such as the sodium alkyl aryl sulfates and sulfonates, alkylated aryl sulfonates; sulfonated and chlorosulfonated paraffin hydrocarbons; sulfated and sulfonated derivatives of non-ionic compounds, such as the sodium alkyl aryl polyether sulfates and sulfonates; aliphatic amines and their derivatives; aromatic amines having fatty chains; fatty amides of aliphatic diamines; quaternary ammonium compounds (bases and halides), such as dimethyl phenyl benzyl ammonium chloride, decyl trimethyl ammonium chloride, dodecyl trimethyl ammonium chloride, tetradecyl trimethyl ammonium chloride, hexadecyl trimethyl ammonium chloride, octadecyl trimethyl ammonium chloride, amides derived from amino alcohols and their quaternary ammonium derivatives; basic compounds of pyridinium and its derivatives; polypropanol and polyethanol amines; urethanes or basic salts of ethylene diamine; condensation products of fatty substances and their derivatives with ethylene oxide, such as the polyoxalkylene ethers of partial lauric, palmitic, stearic, or oleic acid esters; and condensation products of phenolic compounds having side chains with ethylene oxide, such as the condensation product of dodecyl phenol with ethylene oxide.

The concentration of the emulsifying agent is critical. Excessively low concentrations of the emulsifying agent results in a polymerized product of very large, dense lumps. Too high a concentration of emulsifying agent creates a problem in the recovery in the polymerized product. The concentration of the emulsifying agent, accordingly, must be maintained above about 2 percent based on the weight of the monomer or monomers and should not exceed about 12 percent. A more preferred range of concentration for the emulsifying agent is between about 4–8 percent by weight of the monomer or monomers.

The temperature for the polymerization is not critical, although it is dependent upon the particular monomer or monomers employed and also upon the catalyst selected for the process. In general, polymerization temperatures of between about 0° and 150° C. are suitable. A more preferred temperature range is between about 15° and 100° C. When employing catalysts, such as acetyl peroxide, peracetic acid, isopropyl carbonate, and the like, temperatures of about 30° to 50° C. are preferred. When using lauryl peroxide and benzoyl peroxide, somewhat higher temperatures are desirable, between about 40° to 80° C. When peroxide catalysts are employed which decompose at higher temperatures such as, for example, di-t-butyl peroxide, temperatures of above about 100° C. are preferred.

The process can be carried out using either a batch or continuous technique. Agitation of the reaction mixture is normally necessary, but should be controlled to prevent shearing of the polymer particles.

The following are typical examples of polymerizations carried out in accordance with the present invention but these examples are only illustrative and should not be construed as limiting the invention.

Example I

To a glass polymerization vessel provided with agitation is added 100 parts of distilled water, 0.2 part of lauryl peroxide, and 4 parts of sodium lauryl sulfate. To this mixture was added 50 parts of vinyl chloride. The temperature of the polymerization mixture was maintained at 45° C. for 20 hours while maintaining continuous agitation. Ninety-eight (98) percent of the vinyl chloride monomer polymerized giving white aggregates resembling "popcorn." The aggregate particles ranged in diameter from about 3 to 7 mm., the major quantity of the product having a particle size of about 4 mm. in diameter. The bulk density of the product was 8 pounds per cubic foot. The molecular weight of the product was 62,000.

Example II

This example was carried out the same as Example I, except that only one percent of sodium lauryl sulfate based upon the weight of the monomer was employed as the emulsifying agent. In this example the product was obtained in large, dense lumps, with a particle size varying over a large range. The product had an entirely different appearance from that of Example I, the particles having a dense, hard surface and no resemblance to "popcorn." In addition, the bulk density of the product was materially higher than the product of Example I, being 37 pounds per cubic foot.

Example III

Example I was repeated except that 2 parts of lauryl sulfate (4% by weight of the monomer) was employed as the emulsifying agent. This example can also be compared with Example II in which insufficient quantities of emulsifying agents were employed. In this example, 98 percent of the vinyl chloride polymerized and gave a product similar to that of Example I, i. e., having a high surface area and resembling "popcorn" in appearance. The bulk density of the product was 15 pounds per cubic foot.

Example IV

Example I is repeated except that the vinyl chloride is substituted by the addition of 50 parts of styrene. In this example, acetyl peroxide is employed as the catalyst. The temperature is maintained at 35° C. and the polymerization time is 10 hours. The polystyrene obtained is a white, low density product resembling "popcorn."

Example V

Example I is repeated using vinyl acetate as the monomer and benzoyl peroxide as the catalyst. The reaction mixture is maintained at 60° C. for 10 hours. The product is obtained as a white, low density material in a form resembling "popcorn."

Example VI

Example I is repeated employing acrylonitrile as the monomer. The polyacrylonitrile obtained is similar in form to that obtained in Example I.

If the monomers of the above examples are substituted by other vinyl halides, such as vinyl fluoride, vinyl bromide, vinylidene fluoride, vinylidene bromide, similar results are obtained. Also, a product in generally the same form is obtained when polymerizing according to the above examples allyl acetate, methyl acrylate, methyl methacrylate, methacrylonitrile, and similar monomers.

The product of this invention as illustrated in the above examples has a bulk density below about 20 pounds per cubic foot and preferably has a bulk density below about 10 pounds per cubic foot. Each particle of the polymer is formed in an aggregate of many smaller particles, providing an extremely porous product having a high surface area per unit volume.

The product described above is very useful for all the applications presently made of conventional polymers, such as polyvinyl chloride, polystyrene, polymethyl methacrylate, and the like. Accordingly, the products of this invention can be used in the manufacture of films, sheeting, castings, structural forms, and the like. Due to the extremely low bulk density of the product, it can also be employed as a heat or electrical insulating material or as a filler. When used as a filler, the polymer can be partially fused to provide a rigid foam-type structure in air foils and other structures requiring high strength characteristics and low weight.

We claim:
1. A process for polymerizing vinyl compounds comprising conducting the polymerization at a temperature between 0° to 150° C. in an aqueous emulsion system consisting essentially of water, an emulsifying agent and a water insoluble catalyst which is soluble in the vinyl compound to be polymerized, said emulsifying agent being present in a concentration of between about 4 and 8 percent based upon the weight of said vinyl compound.

2. The process of claim 1 wherein the vinyl compound is vinyl chloride.

3. A porous, non-fused polymer having an aggregate form with a bulk density below about 20 pounds per cubic foot formed by polymerization of a vinyl compound in an aqueous emulsion medium consisting essentially of water, an emulsifying agent and a water insoluble catalyst which is soluble in the vinyl compound to be polymerized, said emulsifying agent being present in a concentration of between about 4 and 8 percent based upon the weight of said vinyl compound.

4. A porous, non-fused polyvinyl chloride having an aggregate form with a bulk density not greater than about 20 pounds per cubic foot formed by polymerization of vinyl chloride in an aqueous emulsion medium consisting essentially of water, an emulsifying agent and a water insoluble catalyst which is soluble in the vinyl chloride, said emulsifying agent being present in a concentration between about 4 and 8 percent based upon the weight of the vinyl chloride.

5. A process for polymerizing vinyl compounds comprising conducting the polymerization at a temperature between 15°–100° C. in an aqueous emulsion system consisting essentially of water, an emulsifying agent and a water insoluble catalyst which is soluble in the vinyl compound to be polymerized, said emulsifying agent being present in a concentration between about 4 and 8 percent and said catalyst being present in a concentration of not greater than 1 percent, both percentages being based upon the weight of said vinyl compound.

References Cited in the file of this patent

UNITED STATES PATENTS

| | | |
|---|---|---|
| 2,395,344 | Schoenfeld | Feb. 19, 1946 |
| 2,553,916 | Halbig | May 22, 1951 |
| 2,706,192 | Hoag | Apr. 12, 1955 |

OTHER REFERENCES

Schildknecht: "Vinyl and Related Polymers," 395,396 Wiley (February 20, 1952).